US012583946B2

(12) United States Patent
Chang et al.

(10) Patent No.: US 12,583,946 B2
(45) Date of Patent: Mar. 24, 2026

(54) SYSTEMS AND TECHNIQUES FOR HEATING POLYMER REACTOR FLASHLINES

(71) Applicant: CHEVRON PHILLIPS CHEMICAL COMPANY LP, The Woodlands, TX (US)

(72) Inventors: Ai-Fu Chang, The Woodlands, TX (US); Hetian Li, The Woodlands, TX (US); Christina Barry, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 979 days.

(21) Appl. No.: 17/664,275

(22) Filed: May 20, 2022

(65) Prior Publication Data

US 2023/0399419 A1 Dec. 14, 2023

(51) Int. Cl.
C08F 2/01 (2006.01)
B01J 19/00 (2006.01)
C08F 10/02 (2006.01)

(52) U.S. Cl.
CPC ............. C08F 2/01 (2013.01); B01J 19/0013 (2013.01); C08F 10/02 (2013.01); B01J 2219/00063 (2013.01); B01J 2219/00065 (2013.01); B01J 2219/00085 (2013.01)

(58) Field of Classification Search
CPC ......... C08F 6/00; B01J 19/0013; B01J 19/087
USPC ........................................................ 528/501
See application file for complete search history.

(56) References Cited

U.S. PATENT DOCUMENTS

| 4,126,743 A | 11/1978 | Shiomura |
| 8,519,094 B2 | 8/2013 | Marissal |
| 8,597,582 B2 | 12/2013 | Hottovy |
| 10,549,251 B2 | 2/2020 | Schwerdtfeger |
| 10,556,971 B2 | 2/2020 | Lawson |

(Continued)

FOREIGN PATENT DOCUMENTS

EP 2276561 B1 6/2019

OTHER PUBLICATIONS

IUPAC Compendium of Chemical Terminology, 2nd Ed. 1997, pp. 1-1670.

(Continued)

*Primary Examiner* — Fred M Teskin
(74) *Attorney, Agent, or Firm* — Eversheds Sutherland (US) LLP

(57) ABSTRACT

A polyolefin reactor flashline heater system may include an enclosure, a heating section, and a transformer. The heating section is contained in the enclosure and extends between a first end and a second end. The first end is fluidically coupled to a polyolefin reactor product inlet. The second end is fluidically coupled to a heated product outlet. One or more pipe sections are coupled in series between the first end and the second end. The one or more pipe sections are formed of an electrically conducting material and have a predetermined diameter to transport a polyolefin reactor stream from the first end to the second end. The transformer is electrically coupled to the first end and the second end and configured to heat the heating section by impedance heating. A polymerization system may include a polyolefin reactor coupled to the polyolefin reactor flashline heater system.

25 Claims, 4 Drawing Sheets

(56)              References Cited

U.S. PATENT DOCUMENTS

| | | | |
|---|---|---|---|
| 11,814,453 B2 | 11/2023 | Li | |
| 2013/0005929 A1* | 1/2013 | Hottovy | C08F 10/00 |
| | | | 422/138 |
| 2014/0171603 A1 | 6/2014 | Bhandarkar | |
| 2014/0329977 A1 | 11/2014 | Hottovy | |
| 2017/0158784 A1 | 6/2017 | Hottovy | |
| 2018/0001293 A1 | 1/2018 | Kufeld | |
| 2020/0207883 A1 | 7/2020 | Curren | |
| 2021/0179746 A1 | 6/2021 | Garner | |

OTHER PUBLICATIONS

International Search Report and Written Opinion issued in corresponding PCT Application No. PCT/US2023/066861, mailed on Sep. 27, 2023, 11 pp.

* cited by examiner

FIG. 1C          FIG. 1D

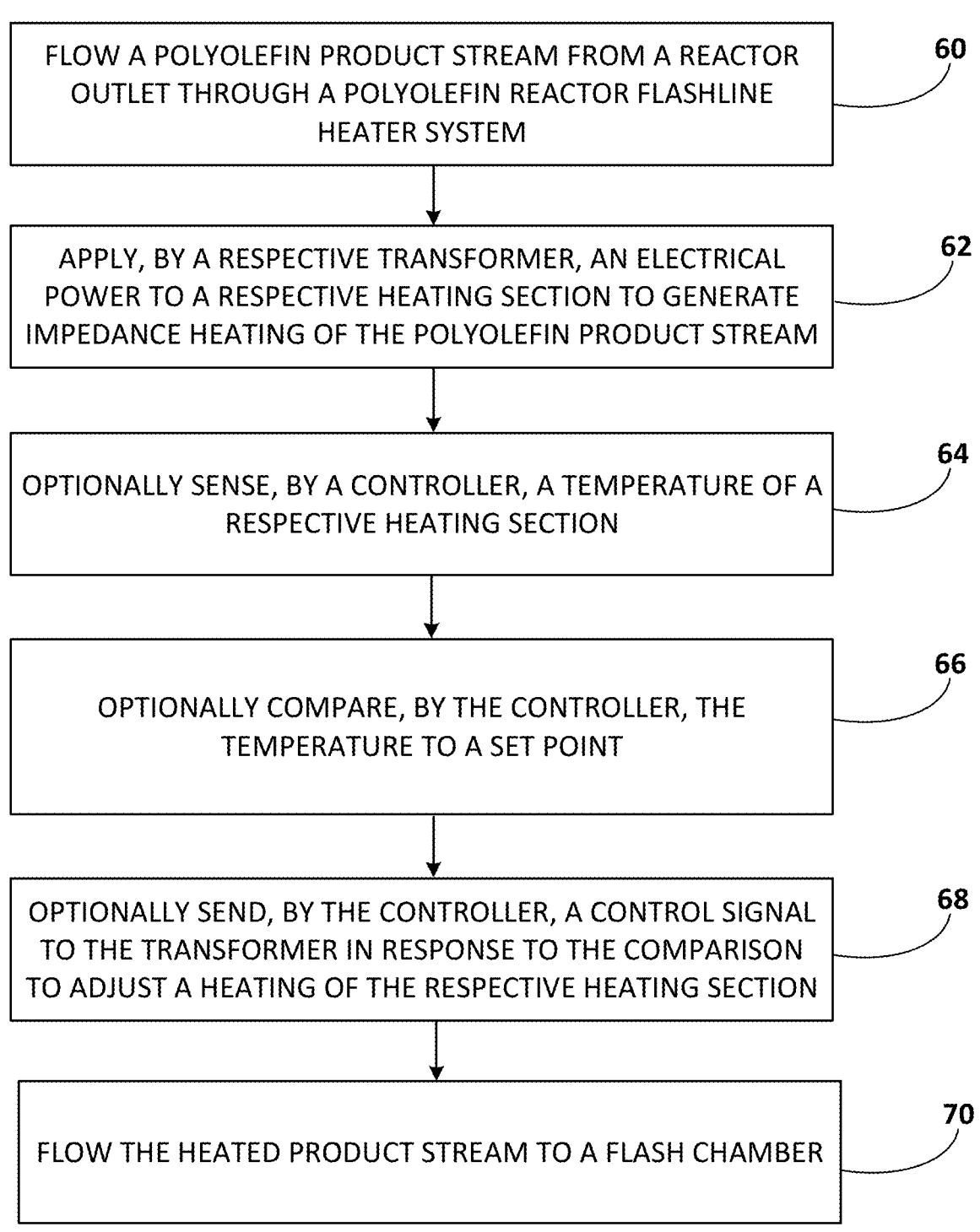

FLOW A POLYOLEFIN PRODUCT STREAM FROM A REACTOR OUTLET THROUGH A POLYOLEFIN REACTOR FLASHLINE HEATER SYSTEM

60

APPLY, BY A RESPECTIVE TRANSFORMER, AN ELECTRICAL POWER TO A RESPECTIVE HEATING SECTION TO GENERATE IMPEDANCE HEATING OF THE POLYOLEFIN PRODUCT STREAM

62

OPTIONALLY SENSE, BY A CONTROLLER, A TEMPERATURE OF A RESPECTIVE HEATING SECTION

64

OPTIONALLY COMPARE, BY THE CONTROLLER, THE TEMPERATURE TO A SET POINT

66

OPTIONALLY SEND, BY THE CONTROLLER, A CONTROL SIGNAL TO THE TRANSFORMER IN RESPONSE TO THE COMPARISON TO ADJUST A HEATING OF THE RESPECTIVE HEATING SECTION

68

FLOW THE HEATED PRODUCT STREAM TO A FLASH CHAMBER

SYSTEMS AND TECHNIQUES FOR HEATING POLYMER REACTOR FLASHLINES

CROSS REFERENCE TO RELATED APPLICATIONS

None.

TECHNICAL FIELD

This disclosure relates to systems and techniques for polymerization, and in particular, to systems and techniques for heating polymer reactor flashlines.

BACKGROUND

Single- or multiple-reactor systems may be used to produce polymer resins, such as polyethylene. For example, polyethylene may be produced using loop slurry reactors or gas-phase reactors. The product stream collected from a polymerization system may include residual components, for example, hydrocarbons carried with polymer flakes or particles. Polymer particles may be separated from residual hydrocarbons in a flash chamber, also known as a separation vessel or chamber. Before the product stream enters the flash chamber, the product stream is heated with steam in a flashline steam to vaporize hydrocarbons.

A need remains for new and improved systems and processes for heating polymer reactor flashlines to facilitate separation of polymer particles from residual components.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, the present disclosure describes a polyolefin reactor flashline heater system including an enclosure, a heating section, and a transformer. The enclosure defines a polyolefin reactor product inlet and a heated product outlet. The heating section is contained in the enclosure and extends between a first end and a second end. The first end is fluidically coupled to the polyolefin reactor product inlet. The second end is fluidically coupled to the heated product outlet. The heating section includes one or more pipe sections coupled in series between the first end and the second end. The one or more pipe sections have a predetermined diameter to transport a polyolefin reactor product from the first end to the second end. The one or more pipe sections are formed of an electrically conducting material. The transformer is electrically coupled to the first end and the second end and configured to heat the heating section by impedance heating of the one or more pipe sections.

In aspects, the present disclosure describes a polymerization system including a polyolefin reactor having a reactor outlet; and the polyolefin reactor flashline heater system. The reactor product inlet of the polyolefin reactor flashline heater system is coupled to the reactor outlet.

In aspects, the present disclosure describes a technique of vaporizing hydrocarbons in a polyolefin product stream produced by the polymerization system. The technique includes flowing the polyolefin product stream from the reactor outlet through the polyolefin reactor flashline heater system. The technique further includes applying, by a respective transformer, an electrical power to a respective heating section to generate impedance heating of the polyolefin product stream in the respective heating section to a predetermined temperature sufficiently high to vaporize at least a portion of the hydrocarbons in the polyolefin product stream.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

FIG. 1C is a conceptual diagram showing a partial cross-section of the enclosure of FIG. 1A showing an insulating layer along a wall.

FIG. 1D is a conceptual diagram showing a partial cross-section of an insulated pipe section of the polyolefin reactor flashline heater system of FIG. 1A.

FIG. 3 is a flow diagram showing a technique for operating a polymerization system including a polyolefin reactor fluidically coupled to a flashline heater system.

Figure 1A:
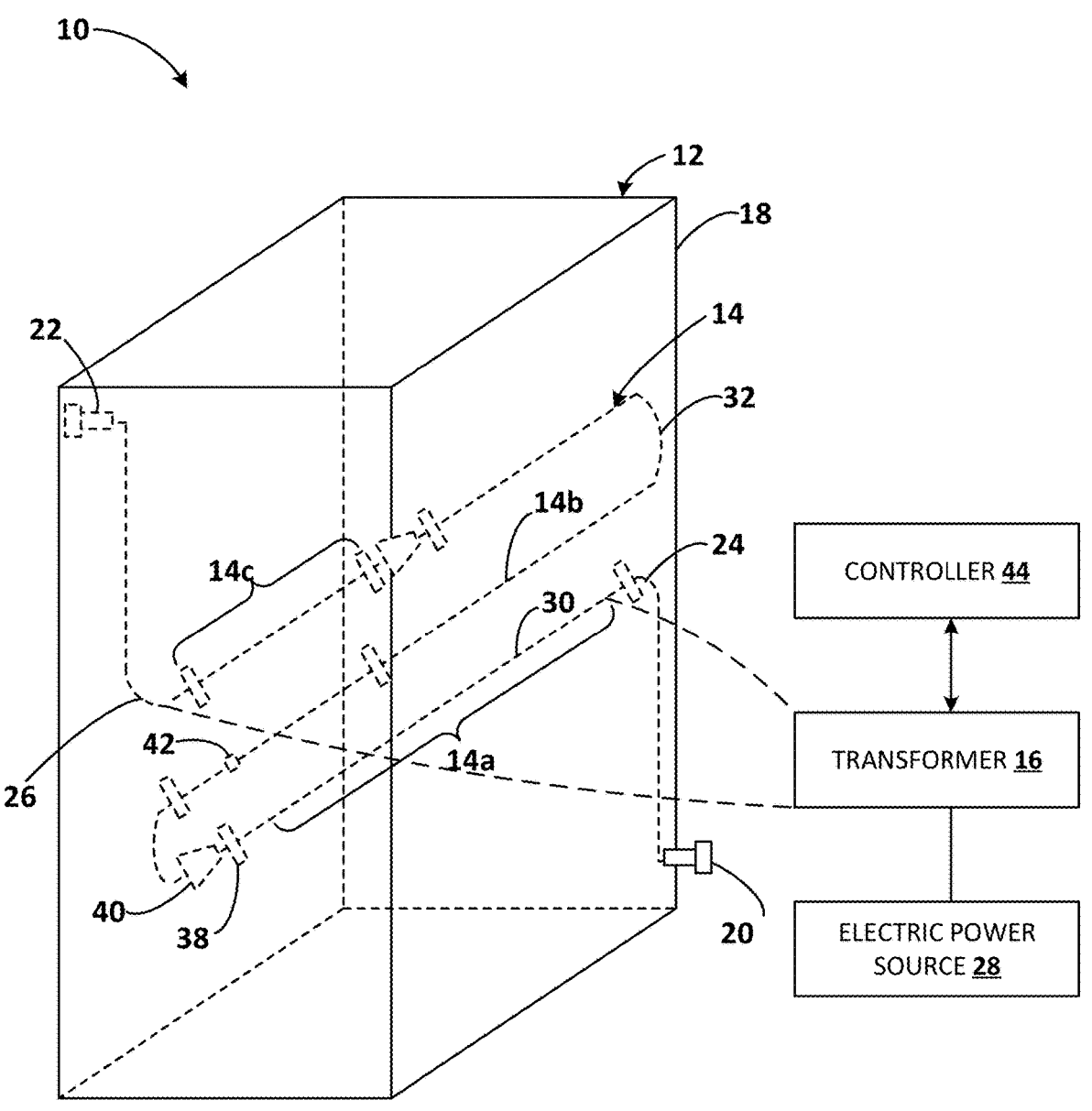
FIG. 1A is a conceptual diagram showing a polyolefin reactor flashline heater system including an enclosure, a heating section, and a transformer.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and techniques are described in terms of "comprising" various components or steps, the compositions and techniques can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about," for example, from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself In another aspect, use of the term "about" means ±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

For the purposes of the present disclosure, "polymer flakes" when used in the context of products of a polymerization reactor refers to a powder, fluff, flake, or similar form of polymer typically produced by polymerization reactors.

Although any techniques and materials similar or equivalent to those described herein can be used in the practice or testing of the invention, the typical techniques and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to systems and techniques for polymerization, and in particular, to systems and techniques for heating polymer reactor flashlines. Polymers may be produced by contacting one or more monomers with a catalyst in a polyolefin reactor. For example, polyethylene may be produced by contacting ethylene with a catalyst in a gas phase reactor or a loop slurry reactor. The polyolefin product, for example, polyethylene in a slurry, may be withdrawn from the reactor and transferred to a flash chamber to separate polymer from residual components such as hydrocarbons. The flash chamber is at a lower pressure than the pressure at which the polyolefin product is withdrawn from the reactor. Flashlines are used to couple the reactor to the flash chamber. To facilitate substantially complete separation of the polymer particles in the flash chamber, the product stream is heated in the flashlines to vaporize at least a portion of the residual components, for example, substantially an entirety of hydrocarbons.

Steam heating systems may be used to heat flashlines. However, the use of steam entails the use of steam supply lines, condensate removal lines, and other equipment to generate and transport steam. Various steam supply lines and condensate removal lines may become water-logged or water-hammered to the point where the heaters may exhibited reduced functionality and provide insufficient heating.

Further, the heating needs to be adequately and reliably controlled so that the polyolefin product is not unacceptably modified by the heating. For example, to retain the polymer in a substantially solid particulate or flake form and prevent agglomeration or sticking, overheating beyond a softening point or a melting point of the polyolefin product should preferably be avoided.

Systems and techniques according to the present disclosure provide a flashline heating using electric power. For example, instead of steam heating, impedance type electric heating may be used to ensure full hydrocarbon vaporization, and without melting the polymer or softening the polymer beyond an acceptable point.

Systems and techniques according to the present disclosure reduce or eliminate the need for steam equipment, including steam supply headers and condensate return headers that are susceptible to water hammering and water logging in the flashline heater system. Line routing also is simplified, since the geometric constraints related to the use of steam such as minimum slope requirement on sub-headers are no longer necessary limitations.

In aspects, the present disclosure describes a polyolefin reactor flashline heater system including an enclosure, a heating section, and a transformer. The enclosure defines a polyolefin reactor product inlet and a heated product outlet. The heating section is contained in the enclosure and extends between a first end and a second end. The first end is fluidically coupled to the polyolefin reactor product inlet. The second end is fluidically coupled to the heated product outlet. The heating section includes one or more pipe sections coupled in series between the first end and the second end. The one or more pipe sections have a predetermined diameter to transport a polyolefin reactor product from the first end to the second end. The one or more pipe sections are formed of an electrically conducting material. The transformer is electrically coupled to the first end and the second end and configured to heat the heating section by impedance heating of the one or more pipe sections.

In aspects, the present disclosure describes a polymerization system including a polyolefin reactor having a reactor outlet; and the polyolefin reactor flashline heater system. The reactor product inlet of the polyolefin reactor flashline heater system is coupled to the reactor outlet.

In aspects, the present disclosure describes a technique of vaporizing hydrocarbons in a polyolefin product stream produced by the polymerization system. The technique includes flowing the polyolefin product stream from the reactor outlet through the polyolefin reactor flashline heater system. The technique further includes applying, by a respective transformer, an electrical power to a respective heating section to generate impedance heating of the polyolefin product stream in the respective heating section to a predetermined temperature sufficiently high to vaporize at least a portion of the hydrocarbons in the polyolefin product stream.

FIG. 1A is a conceptual diagram showing a polyolefin reactor flashline heater system 10 including an enclosure 12, a heating section 14, and a transformer 16. The enclosure 12 may house one or more components, such as the heating section 14. In aspects, the enclosure 12 may shield or insulate an exterior environment from electrical power flowing through the heating section 14. The enclosure 12 may also facilitate maintaining a uniform or stable temperature of the heating section 14, for example, by at least partially shielding or insulating heating section 14 from fluctuations in a temperature of the external environment. The enclosure 12 may be formed of a wall 18. The wall 18 may be formed of any suitable material, for example, a metal, an alloy, a ceramic, a glass, or a composite. In some aspects, the enclosure 12 may be substantially continuous, for example, defining no openings or windows other than those associated with inlets or outlets. In other aspects, the enclosure 12 may define openings or windows. In some aspects, the flashline heater system 10 may not include a separate enclosure 12, and the heating section 14 may be enclosed in an enclosure associated with a reactor or another component. In some aspects, the flashline heater system 10 may not include any enclosure, and the heating section 14 may be exposed to the ambient environment.

The enclosure 12 may define a polyolefin reactor product inlet 20 and a heated product outlet 22. In some aspects, one or both of the polyolefin reactor product inlet 20 or the heated product outlet 22 may be separate units joined, coupled, or secured to the enclosure 12. A polyolefin product stream from a polyolefin reactor may be introduced into the polyolefin reactor flashline heater system 10 via the polyolefin reactor product inlet 20 for heating. For example, the polyolefin reactor flashline heater system 10 may heat the polyolefin product stream such to form a heated product stream in which residual hydrocarbons are at least partially or substantially vaporized. The heated product stream may exit the polyolefin reactor flashline heater system 10 via the heated product outlet 22, and be sent to a flash chamber for further processing. The vaporization of the hydrocarbons in the polyolefin reactor flashline heater system 10 may facilitate or promote substantially complete separation of polymer flakes or particles in the heated product stream from residual hydrocarbons in the flash chamber. In some aspects, the product stream includes a slurry of polyolefin particles.

The pressure and/or the temperature at the polyolefin reactor product inlet 20 would differ from that at the heated product outlet 22 as the product stream passes through the polyolefin reactor flashline heater system 10. For example, there may be a pressure drop and a temperature increase at the heated product outlet 22 relative to the polyolefin reactor product inlet 20.

The heating section 14 applies heat to the polyolefin product stream. The heating section 14 is contained in the enclosure 12 and extends between a first end 24 and a second end 26. The first end 24 is fluidically coupled to the polyolefin reactor product inlet 20, and the second end 26 is fluidically coupled to the heated product outlet 22 for example, via respective piping. The piping may include a single pipe section or a plurality of pipe sections, and be straight, bent, curved, or have any appropriate compound path. In some aspects, the first end 24 may extend to or otherwise be directly coupled to the polyolefin reactor product inlet 20. Likewise, in some aspects, the second end 26 may extend to or otherwise be directly coupled to the heated product outlet 22. In some aspects, the enclosure 12 may not define or be coupled to one or both of the polyolefin reactor product inlet 20 or the heated product outlet 22. Instead, one or both of the first end 24 and the second end 26 may define or be secured or coupled to the polyolefin reactor product inlet 20 or the heated product outlet 22. In some such aspects, at least a portion of one or both of the first end 24 and the second end 26 may protrude from an interior of the enclosure 12 into an exterior, and the protruding portion may respectively define the polyolefin reactor product inlet 20 or the heated product outlet 22.

The heating section 14 includes one or more pipe sections (shown in FIG. 1B) coupled in series between the first end 24 and the second end 26. In some aspects, one or more pipe sections may extend between the first end 24 and the second end 26, and at least one of the one or more pipe sections may constitute the heating section 14. In some aspects, different sub-pluralities of pipe sections may constitute respective heating sections of a plurality of heating sections. The heating section 14 may be a single heating section, or one of a plurality of heating sections joined in any suitable combination of series or parallel heating sections. For example, in FIG. 1, the polyolefin reactor flashline heater system 10 may include a first heating section 14a, a second heating section 14b, and a third heating section 14c.

The one or more pipe sections, and ultimately, the heating section 14, is heated by impedance heating. In impedance heating, no separate heating element is present, and a pipe section itself generates heat via impedance to an electrical power applied across a length of the pipe section. The one or more pipe sections are formed of an electrically conducting material to permit impedance heating. In aspects, the electrically conducting material includes a metal or an alloy. In some aspects, the electrically conducting material consists of or includes a steel. In some such aspects, the electrically conducting material includes, consists of, or consists essentially of 304L stainless steel.

The transformer 16 is electrically coupled to the first end 24 and the second end 26 and configured to heat the heating section 14 by impedance heating of the one or more pipe sections, for example, by applying a predetermined voltage across the heating section 14. The same transformer 16 may power different heating sections, or different transformers may power different heating sections. For example, as shown in FIG. 1A, a same transformer 16 may power the first, second, and third heating sections 14a, 14b, and 14c, by being coupled across the collective first and second ends 24 and 26 of the collective heating section 14. In other aspects, one or more transformers may power one or more of respective heating sections, for example, being electrically coupled to respective ends of one or more heating sections 14a, 14b, 14c, or the like.

The polyolefin reactor flashline heater system 10 may further include an electric power source 28 coupled to the transformer 16. If more than one transformers are present, the same electric power source 28 may power all transformers, or each transformer may be powered by a respective electric power source.

The one or more pipe sections may have a predetermined diameter to transport a polyolefin reactor product from the first end 24 to the second end 26. The diameter and length of pipe sections in heating section ultimately influences the flow rate through and the pressure drop across the heating section 14. The geometry of pipe sections in the heating section 14 also affects the impedance heating characteristics of the heating section 14. For example, a transformer may need to apply different voltages across a heating section to achieve a predetermined level of heating for different pipe diameters and/or pipe lengths. The heat input to or temperature control for one or more of the pipe sections or heating sections can be adjusted based on operating conditions and plant conditions.

Figure 1B:
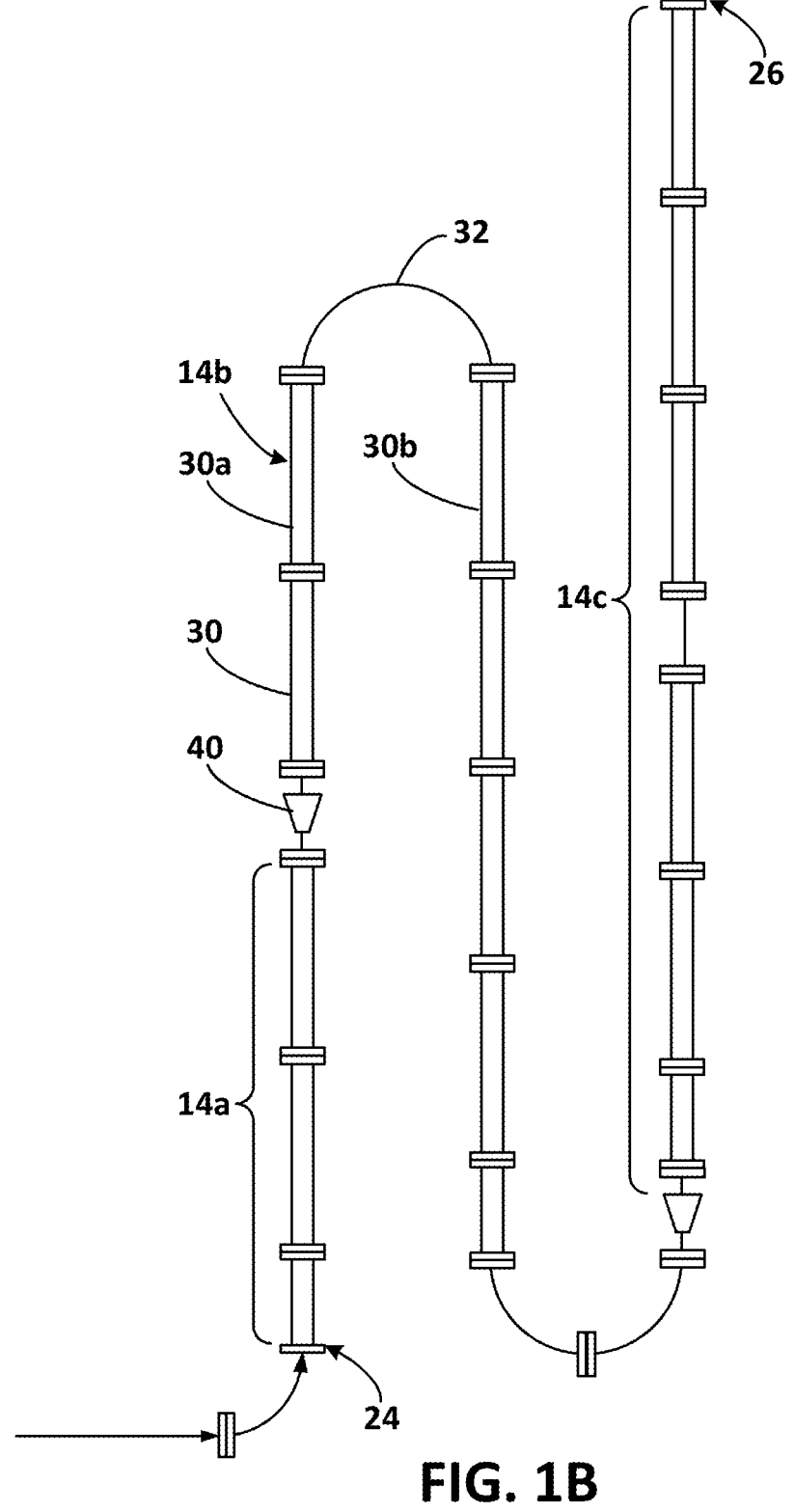
FIG. 1B is a conceptual diagram showing a plurality of heating sections respectively including a plurality of pipe sections in the polyolefin reactor flashline heater system of FIG. 1A.

FIG. 1B is a conceptual diagram showing a plurality of heating sections 14a, 14b, and 14c respectively including a plurality of pipe sections 30 in the polyolefin reactor flashline heater system 10 of FIG. 1A. Each of the heating sections may include the same or different number of pipe sections. The pipe sections in a respective heating section may have the same or different pipe diameters, pipe wall thickness, and pipe lengths. For example, pipe section 14a includes two long pipe sections and one short pipe section.

In aspects, an adjacent pair of pipe sections 30a and 30b of the plurality of pipe sections is fluidically coupled by a U-bend 32 to undulate between the first end 24 and the second end 26. The U-bend 32 may have the same diameter as one or both adjacent pipe sections 30a and 30b, or may be narrower or wider than one or both of adjacent pipe sections 30a and 30b. For example, in FIG. 1B, the second heating section 14b includes a pair of the pipe sections 30a and 30b coupled by the U-bend 32. Such a pair of pipe sections 30a, 30b of pipe sections may be present in one or more heating sections. In some aspects, the pair of pipe sections 30a, 30b may extend across adjacent heating sections. For example, one of the pipe sections 30a and 30b may be part of a first heating section 14a, and another of the pipe sections 30a and 30b may be part of a second heating section 14b.

In some aspects, the enclosure 12 further includes thermal insulation, for example, to reduce or minimize heat loss from the polyolefin reactor flashline heater system 10. The insulation may be placed along or near the wall 18 of the enclosure or surround pipe sections 30.

FIG. 1C is a conceptual diagram showing a partial cross-section of the enclosure of FIG. 1A showing an insulating layer 34 along the wall 18. FIG. 1D is a conceptual diagram showing a partial cross-section of an insulated pipe section 30 of the polyolefin reactor flashline heater system of FIG. 1A including a pipe wall 36 surrounded by the insulating layer 34. The insulating layer, whether along the wall 18, or the pipe wall 36, or both, may be continuous or discontinuous, and may be provided as separate patches or units, or as a substantially continuous layer. The system of aspect 6, wherein the thermal insulating layer may include any suitable insulating material, for example, glass or ceramic. In some aspects, the enclosure 12 is a rectangular cuboid (as shown in FIG. 1A) having the thermal insulating layer 34 present on each internal face of the enclosure 12. The thermal insulating layer 34 may surround the plurality of pipe sections 30, for example, about each pipe section, or about selected pipe sections of the plurality of pipe sections 30. In some aspects, one or more U-bends 32 are also surrounding by the thermal insulating layer 34.

Turning back to FIG. 1B, the first heating section 14a may include a first plurality of pipe sections. The first plurality of pipe sections may each have a same predetermined first diameter. The transformer 16 may be a first transformer, and the system may further include a second transformer electrically coupled to and configured to heat the second heating section 14b by impedance heating of a second plurality of pipe sections of the second heating section 14b. The second heating section 14b enclosed in the enclosure 12 may be fluidically coupled to the first heating section 14a. The second plurality of pipe sections may have a second diameter greater than the first diameter of the first plurality of pipe sections of the first heating section 14a. In some aspects, the second transformer has a greater operating voltage than the first transformer. Thus, a greater voltage may be applied across the second heating section 14b than the voltage applied across the first heating section 14a, for example, when the second diameter of the second plurality of pipe sections of the second heating section 14b is greater than the first diameter of the first plurality of pipe sections of the first heating section 14a.

In some aspects, adjacent heating sections may be electrically insulated from each other. For example, the first heating section 14a may be electrically insulated from the second heating section 14b, and/or the second heating section 14b may be electrically insulated from the third heating section 14c. For example, an electric insulator 38 may be present between adjacent heating sections 14a and 14b, and/or between heating sections 14b and 14c, when different voltages are applied across the different heating sections.

The electric insulator 38 may be provided in any suitable shape, for example, a plate, a disc, a cube, a cylinder, or any suitable two-dimensional or three-dimensional shape. The electric insulator 38 may include any suitable electric insulating material, for example, glass, ceramic, or the like.

In some aspects, different sub-sections of a same heating section may be heated by more than one transformer. In some such aspects, the electric insulator 38 may be present at an intermediate position along a heating section (for example, as shown in the second heating section 14b in FIG. 1A). For example, the intermediate position may be between two sub-pluralties of pipe sections of the heating section.

In some aspects, adjacent heating sections are coupled by one or more flow structures. For example, the first heating section 14a may be fluidically coupled to the second heating section 14b by a U-bend 32. Providing U-bends either between heating sections or between pipe sections in a heating section may promote compactness of the enclosure 12 and of the polyolefin reactor flashline heater system 10 as a whole. For example, various pipe sections and heating sections may undulate to be retained within a relatively compact volume in enclosure 12 relative to a length of unbent pipe sections or heating sections.

Pipe sections or heating sections having different diameters may be coupled by expanders or reducers. In aspects, the system 10 further includes a first expander 40 gradually expanding from the first diameter of the first heating section 14a to the second diameter of the second heating section 14b

(where the diameter of the second heating section 14a is greater than that of the first heating section 14a).

The polyolefin reactor flashline heater system 10 may further include the third heating section 14c enclosed in the enclosure 12 fluidically coupled to the second heating section 14b. The third heating section 14c may include a third plurality of pipe sections. In some aspects, the third plurality of pipe sections has a third diameter greater than the second diameter of the second plurality of pipe sections 14b. In some aspects, the polyolefin reactor flashline heater system 10 may further include a third transformer electrically coupled to and configured to heat the third heating section 14c by impedance heating of the third plurality of pipe sections. In some such aspects, the third transformer has a greater operating voltage than the second transformer. Thus, a greater voltage may be applied across the third heating section 14c than the voltage applied across the second heating section 14b, for example, when the third diameter of the third plurality of pipe sections of the third heating section 14c is greater than the second diameter of the second plurality of pipe sections of the second heating section 14b.

While one or more heating sections may include a respective plurality of pipe sections, in other embodiments, one or more heating sections may include a single respective pipe section.

The third heating section 14c may be electrically insulated from the second heating section 14b. For example, the electrical insulator 38 may be present between the second heating section 14b and the third heating section 14c.

The third heating section 14c may be fluidically coupled to the second heating section 14b by a U-bend. In some aspects, the polyolefin reactor flashline heater system 10 further includes a second expander (similar to the first expander 40 but with appropriate input and output diameters) gradually expanding from the second diameter of the second heating section 14b to the third diameter of the third heating section 14c.

The polyolefin reactor flashline heater system 10 may include a sensor 42 to sense a process parameter. The sensor 42 may include a temperature sensor, a pressure sensor, a flow sensor, a hydrocarbon sensor, or any other sensor. For example, one or more respective heating sections 14 may include a respective sensor. One, more than one, or all heating sections may include respective sensors. Likewise, one or more respective pipe sections may include a respective sensor.

The polyolefin reactor flashline heater system 10 may include a controller 44. The controller 44 may be configured to control at least one transformer 16 to heat at least one heating section 14 to a predetermined temperature sufficiently high to vaporize substantially an entirety of hydrocarbons in the polyolefin product stream. In aspects, the predetermined temperature is lower than a melting point of a polyolefin in the polyolefin product stream. In some such aspects, the predetermined temperature is lower than a softening point of the polyolefin in the polyolefin product stream.

Thus, polyolefin reactor flashline heater system 10 may be used to heat a polyolefin product stream such that hydrocarbons are at least partially, or preferably substantially completely vaporized, but without negatively affecting the quality or properties of the polymer flakes or particles.

Figure 2:
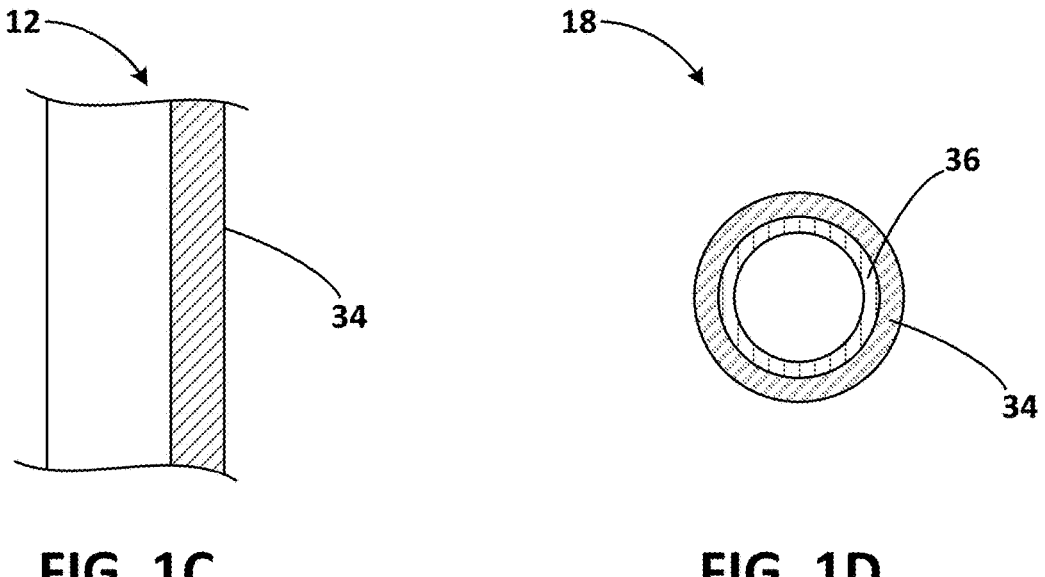
FIG. 2 is a conceptual block diagram showing a polymerization system including a polyolefin reactor fluidically coupled to a flashline heater system.
Figure 2:
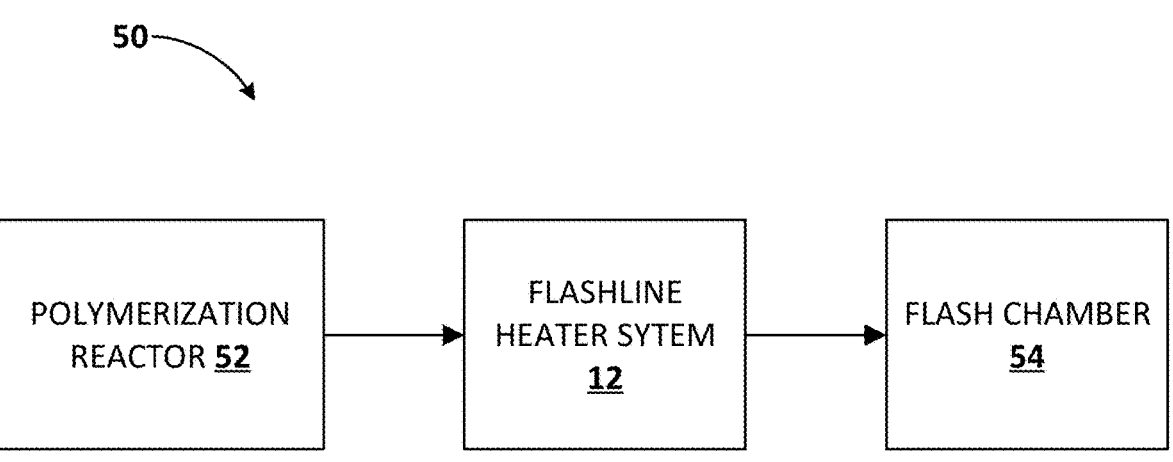

FIG. 2 is a conceptual block diagram showing a polymerization system 50 including a polyolefin reactor 52 fluidically coupled to the polyolefin reactor flashline heater system 10. The flashline heater system is further coupled to a flash chamber 54. For example, the second end of the polyolefin reactor flashline heater system 10 is coupled to the flash chamber 54. The polyolefin product stream from the reactor 52 is introduced in the polyolefin reactor flashline heater system 10 to be heated. For example, the polyolefin reactor 12 may be a polyolefin reactor having a reactor outlet, and the reactor product inlet 20 of the polyolefin reactor flashline heater system 10 is coupled to the reactor outlet. In some such aspects, the polyolefin product stream includes a polyolefin slurry including polyolefin particles and residual hydrocarbons.

The heated product stream from the flashline heater system 10 is introduced in the flash chamber 54 to be separated. For example, the flash chamber 54 may be downstream of and coupled to the heated product outlet 22 of the polyolefin reactor flashline heater system 10. The flash chamber 54 is typically at a lower pressure than the pressure in the polyolefin reactor flashline heater system 10 or in the polyolefin reactor 52, which promote complete vaporization and separation of the polymer particles or flakes from the hydrocarbons. For example, a polyolefin such as polyethylene may be separated from the hydrocarbons.

In aspects, the polyolefin reactor flashline heater system 10 of FIG. 1A or the polymerization system 50 of FIG. 2 or may be operated using techniques described with reference to FIG. 3. However, any suitable technique according to the present disclosure may be used to operate these systems. While the systems and aspects are described with reference to polyethylene production, the systems and aspects may be utilized for other polymerization processes in which flashline heating may be required.

FIG. 3 is a flow diagram showing a technique for operating a polymerization system 50 including a polyolefin reactor 52 fluidically coupled to a flashline heater system 12, for vaporizing hydrocarbons in a polyolefin slurry produced by the polymerization system. The technique of FIG. 3 is described with reference to the polyolefin reactor flashline heater system of FIG. 1A and the polymerization system 50 of FIG. 2 as an example, and can be alternatively practiced with any suitable system according to the present disclosure.

At step 60, the technique includes flowing a polyolefin product stream from the reactor outlet of the reactor 52 through the polyolefin reactor flashline heater system 12. In some aspects, the flowing (60) includes continuously flowing the polyolefin product stream from the reactor outlet through the polyolefin reactor flashline heater system 10.

The technique further includes, at step 62, applying, by a respective transformer 16, an electrical power to a respective heating section 14 to generate impedance heating of the polyolefin product stream in the respective heating section 14 to a predetermined temperature sufficiently high to vaporize at least a portion of the hydrocarbons in the polyolefin product stream. In some aspects, the predetermined temperature is sufficiently high to vaporize substantially an entirety of the hydrocarbons in the polyolefin product stream. In some aspects, the predetermined temperature is lower than a melting point of a polyolefin in the polyolefin product stream. In some aspects, the predetermined temperature is lower than a softening point of the polyolefin in the polyolefin product stream. Providing a temperature lower than the softening point may reduce or prevent sticking or agglomeration of the polyolefin particles.

In aspects, the polyolefin is polyethylene, and wherein the hydrocarbons include one or more of isobutane, hexene, or ethylene.

The pressure typically drops from the reactor outlet through the polyolefin reactor flashline heater system 10. For example, the pressure at the reactor outlet may be from 300 to 500 psig. In aspects, a pressure at the heated product outlet may be lower than 300 to 500 psig, for example, about 150 psig.

The controller 44 may control one or both of steps 60 or 62, for example, by permitting or stopping or controlling the rate of flow of the polyolefin product stream through the polyolefin reactor flashline heater system 10. For example, the controller 44 may control one or more valves to control the flow of the polyolefin product stream.

In aspects, the technique of FIG. 3 may further include, at step 64, sensing, by the controller 44, a temperature of a respective heating section 14. For example, the controller 44 may receive a signal from a sensor indicative of the temperature. The technique may further include, at step 66, comparing, by the controller, the temperature to a set point. The technique may further include, at step 68, sending, by the controller, a control signal to the transformer 16 in response to the comparison to adjust a heating of the respective heating section 14. For example, the sending, by the controller 44, the control signal to the transformer 16 in response to the comparison (68) may cause the transformer 16 to one or more of (1) initiate heating, (2) increase heating, (3) reduce heating, (4) maintain heating, or (5) stop heating of the respective heating section 14.

At step 70, the technique of FIG. 3 may further include flowing the heated product stream from the polyolefin flashline heater system 10 to the flash chamber 54, where the polyolefin particles or flakes may be substantially completely separated from the residual hydrocarbons by flashing.

Thus, the systems and techniques according to the present disclosure may be used to electrically heat flashlines to facilitate complete separation of polymers from residual hydrocarbons in a flash chamber.

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "including" certain components or steps, but alternatively, can "consist essentially of" or "consist of" those components or steps unless specifically stated otherwise.

Aspects

1. A polyolefin reactor flashline heater system including:
   an enclosure defining a polyolefin reactor product inlet and a heated product outlet;
   a heating section contained in the enclosure and extending between a first end and a second end, the first end being fluidically coupled to the polyolefin reactor product inlet, the second end being fluidically coupled to the heated product outlet, the heating section including one or more pipe sections coupled in series between the first end and the second end, the one or more pipe sections having a predetermined diameter to transport a polyolefin reactor product from the first end to the second end, the one or more pipe sections being formed of an electrically conducting material; and
   a transformer electrically coupled to the first end and the second end and configured to heat the heating section by impedance heating of the one or more pipe sections.

2. The system of claim 1, further comprising an electric power source coupled to the transformer.
3. The system of aspects 1 or 2, wherein an adjacent pair of pipe sections of the one or more pipe sections is fluidically coupled by a U-bend to undulate between the first end and the second end.
4. The system of any of aspects 1 to 3, wherein the electrically conducting material includes a steel.
5. The system of any of aspects 1 to 4, wherein the electrically conducting material consists of or consists essentially of 304L stainless steel.
6. The system of any of aspects 1 to 5, wherein the enclosure further includes a thermal insulating layer.
7. The system of aspect 6, wherein the thermal insulating layer includes glass.
8. The system of aspects 6 or 7, wherein the enclosure is a rectangular cuboid having the thermal insulating layer present on each internal face of the enclosure.
9. The system of any of aspects 6 to 8, wherein the thermal insulating layer surrounds the one or more pipe sections.
10. The system of any of aspects 1 to 9, wherein the heating section is a first heating section, wherein the one or more pipe sections includes a first plurality of pipe sections, wherein the predetermined diameter is a first predetermined diameter, wherein the transformer is a first transformer, and wherein the system further includes:
    a second heating section enclosed in the enclosure fluidically coupled to the first heating section, the second heating section including a second plurality of pipe sections, the second plurality of pipe sections having a second diameter greater than the first diameter of the first plurality of pipe sections; and
    a second transformer electrically coupled to and configured to heat the second heating section by impedance heating of the second plurality of pipe sections.
11. The system of aspect 10, wherein the second transformer has a greater operating voltage than the first transformer.
12. The system of aspects 10 or 11, wherein the first heating section is electrically insulated from the second heating section.
13. The system of any of aspects 10 to 12, wherein the first heating section is fluidically coupled to the second heating section by a U-bend.
14. The system of any of aspects 10 to 13, wherein the system further includes a first expander gradually expanding from the first diameter of the first heating section to the second diameter of the second heating section.
15. The system of any of aspects 10 to 14, wherein the system further includes:
    a third heating section enclosed in the enclosure fluidically coupled to the second heating section, the third heating section including a third plurality of pipe sections, the third plurality of pipe sections having a third diameter greater than the second diameter of the second plurality of pipe sections; and
    a third transformer electrically coupled to and configured to heat the third heating section by impedance heating of the third plurality of pipe sections.
16. The system of aspect 15, wherein the third transformer has a greater operating voltage than the second transformer.

17. The system of aspects 15 or 16, wherein the third heating section is electrically insulated from the second heating section.

18. The system of any of aspects 15 to 17, wherein the third heating section is fluidically coupled to the second heating section by a U-bend.

19. The system of any of aspects 15 to 18, wherein the system further includes a second expander gradually expanding from the second diameter of the second heating section to the third diameter of the third heating section.

20. The system of any of aspects 1 to 19, wherein one or more respective heating sections includes a respective temperature sensor.

21. The system of any of aspects 1 to 20, wherein one or more respective pipe sections includes a respective temperature sensor.

22. The system of any of aspects 1 to 21, further including a controller configured to control at least one transformer to heat at least one heating section to a predetermined temperature sufficiently high to vaporize substantially an entirety of hydrocarbons in the polyolefin product stream.

23. The system of aspect 22, wherein the predetermined temperature is lower than a melting point of a polyolefin in the polyolefin product stream.

24. The system of aspect 23, wherein the predetermined temperature is lower than a softening point of the polyolefin in the polyolefin product stream.

25. A polymerization system including:
   a polyolefin reactor having a reactor outlet; and
   the polyolefin reactor flashline heater system of any of aspects 1 to 24, wherein the reactor product inlet of the polyolefin reactor flashline heater system is coupled to the reactor outlet.

26. The polymerization system of aspect 25, further including a flash chamber downstream of and coupled to the heated product outlet of the polyolefin reactor flashline heater system.

27. A method of vaporizing hydrocarbons in a polyolefin product stream produced by the polymerization system of aspects 25 or 26, the method including:
   flowing the polyolefin product stream from the reactor outlet through the polyolefin reactor flashline heater system; and
   applying, by a respective transformer, an electrical power to a respective heating section to generate impedance heating of the v in the respective heating section to a predetermined temperature sufficiently high to vaporize at least a portion of the hydrocarbons in the polyolefin product stream.

28. The method of aspect 27, including continuously flowing the polyolefin product stream from the reactor outlet through the polyolefin reactor flashline heater system.

29. The method of aspects 27 or 28, wherein the predetermined temperature is sufficiently high to vaporize substantially an entirety of the hydrocarbons in the polyolefin product stream.

30. The method of any of aspects 27 to 29, wherein the predetermined temperature is lower than a melting point of a polyolefin in the polyolefin product stream.

31. The method of aspect 30, wherein the predetermined temperature is lower than a softening point of the polyolefin in the polyolefin product stream.

32. The method of any of aspects 27 to 31, wherein the polyolefin is polyethylene, and wherein the hydrocarbons include one or more of isobutane, hexene, or ethylene.

33. The method of any of aspects 27 to 32, wherein a pressure at the reactor outlet is from 300 to 500 psig.

34. The method of any of aspects 27 to 33, wherein a pressure at the heated product outlet is about 150 psig.

35. The method of any of aspects 27 to 34, further including:
   sensing, by the controller, a temperature of a respective heating section;
   comparing, by the controller, the temperature to a set point; and
   sending, by the controller, a control signal to the transformer in response to the comparison to adjust a heating of the respective heating section.

36. The method of aspect 35, wherein the sending, by the controller, the control signal to the transformer in response to the comparison causes the transformer to initiate heating of the respective heating section.

37. The method of aspects 35 or 36, wherein the sending, by the controller, the control signal to the transformer in response to the comparison causes the transformer to increase heating of the respective heating section.

38. The method of any of aspects 35 to 37, wherein the sending, by the controller, the control signal to the transformer in response to the comparison causes the transformer to reduce heating of the respective heating section.

39. The method of any of aspects 35 to 38, wherein the sending, by the controller, the control signal to the transformer in response to the comparison causes the transformer to stop heating of the respective heating section.

40. The method of any of aspects 27 to 39, wherein the polyolefin product stream includes a polyolefin slurry.

We claim:

1. A polyolefin reactor flashline heater system comprising:
an enclosure defining a polyolefin reactor product inlet and a heated product outlet;
a heating section contained in the enclosure and extending between a first end and a second end, the first end being fluidically coupled to the polyolefin reactor product inlet, the second end being fluidically coupled to the heated product outlet, the heating section comprising (i) one pipe section, or (ii) a plurality of pipe sections coupled in series between the first end and the second end, the one or the plurality of pipe sections having a predetermined diameter to transport a polyolefin reactor product from the first end to the second end, the one or the plurality of pipe sections being formed of an electrically conducting material; and
a transformer electrically coupled to the first end and the second end and configured to heat the heating section by impedance heating of the one or the plurality of pipe sections.

2. The system of claim 1, further comprising an electric power source coupled to the transformer.

3. The system of claim 1, wherein the heating section comprises a plurality of pipe sections, wherein an adjacent pair of pipe sections of the plurality of pipe sections is fluidically coupled by a U-bends to undulate between the first end and the second end.

4. The system of claim 1, wherein the electrically conducting material comprises a steel.

5. The system of claim 1, wherein the enclosure further comprises a thermal insulating layer.

6. The system of claim 5, wherein the thermal insulating layer comprises glass.

7. The system of claim 5, wherein the enclosure is a rectangular cuboid having the thermal insulating layer present on each internal face of the enclosure.

8. The system of claim 1, wherein the heating section is a first heating section, wherein the one or the plurality of pipe sections comprises a first plurality of pipe sections, wherein the predetermined diameter is a first predetermined diameter, wherein the transformer is a first transformer, and wherein the system further comprises:

a second heating section enclosed in the enclosure fluidically coupled to the first heating section, the second heating section comprising a second plurality of pipe sections, the second plurality of pipe sections having a second diameter greater than the first diameter of the first plurality of pipe sections; and a second transformer electrically coupled to and configured to heat the second heating section by impedance heating of the second plurality of pipe sections.

9. The system of claim 8, wherein the second transformer has a greater operating voltage than the first transformer.

10. The system of claim 8, wherein the system further comprises a first expander gradually expanding from the first diameter of the first heating section to the second diameter of the second heating section.

11. The system of claim 8, wherein the system further comprises:

a third heating section enclosed in the enclosure fluidically coupled to the second heating section, the third heating section comprising a third plurality of pipe sections, the third plurality of pipe sections having a third diameter greater than the second diameter of the second plurality of pipe sections; and a third transformer electrically coupled to and configured to heat the third heating section by impedance heating of the third plurality of pipe sections.

12. The system of claim 11, wherein the third transformer has a greater operating voltage than the second transformer.

13. The system of claim 11, wherein the system further comprises a second expander gradually expanding from the second diameter of the second heating section to the third diameter of the third heating section.

14. The system of claim 1, wherein one or more respective heating sections comprises a respective temperature sensor.

15. The system of claim 1, further comprising a controller configured to control at least one transformer to heat at least one heating section to a predetermined temperature sufficiently high to vaporize substantially an entirety of hydrocarbons in the polyolefin product stream.

16. The system of claim 15, wherein the predetermined temperature is lower than a melting point of a polyolefin in the polyolefin product stream.

17. A polymerization system comprising:

a polyolefin reactor having a reactor outlet; and the polyolefin reactor flashline heater system of claim 1, wherein the reactor product inlet of the polyolefin reactor flashline heater system is coupled to the reactor outlet.

18. The polymerization system of claim 17, further comprising a flash chamber downstream of and coupled to the heated product outlet of the polyolefin reactor flashline heater system.

19. A method of vaporizing hydrocarbons in a polyolefin product stream produced by the polymerization system of claim 17, the method comprising:

flowing the polyolefin product stream from the reactor outlet through the polyolefin reactor flashline heater system; and applying, by a respective transformer, an electrical power to a respective heating section to generate impedance heating of the polyolefin product stream in the respective heating section to a predetermined temperature sufficiently high to vaporize at least a portion of hydrocarbons in the polyolefin product stream.

20. The method of claim 19, wherein the predetermined temperature is sufficiently high to vaporize substantially an entirety of the hydrocarbons in the polyolefin product stream.

21. The method of claim 19, wherein the predetermined temperature is lower than a melting point of a polyolefin in the polyolefin product stream.

22. The method of claim 19, wherein the polyolefin is polyethylene, and wherein the hydrocarbons comprise one or more of isobutane, hexene, or ethylene.

23. The method of claim 19, wherein a pressure at the reactor outlet is from 300 to 500 psig, and wherein a pressure at the heated product outlet is about 150 psig.

24. The method of claim 19, further comprising:

sensing, by the controller, a temperature of a respective heating section;

comparing, by the controller, the temperature to a set point; and sending, by the controller, a control signal to the transformer in response to the comparison to adjust a heating of the respective heating section.

25. The method of claim 24, wherein the sending, by the controller, the control signal to the transformer in response to the comparison causes the transformer to one or more of (1) initiate heating of the respective heating section, (2) increase heating of the respective heating section, (3) reduce heating of the respective heating section, or (4) stop heating of the respective heating section.

* * * * *